(12) United States Patent
Matsumoto

(10) Patent No.: US 8,723,037 B1
(45) Date of Patent: May 13, 2014

(54) COVER FOR PROTECTING A DUPLEX ELECTRICAL RECEPTACLE AND SIMILAR DEVICES

(76) Inventor: Raymond T. Matsumoto, Scarborough (CA)

( * ) Notice: Subject to any disclaimer, the term of this patent is extended or adjusted under 35 U.S.C. 154(b) by 82 days.

(21) Appl. No.: 13/399,001

(22) Filed: Feb. 17, 2012

(51) Int. Cl.
*H01R 13/46* (2006.01)

(52) U.S. Cl.
USPC .................. 174/67; 174/66; 220/241

(58) Field of Classification Search
USPC .................. 174/66, 67; 220/241, 242
See application file for complete search history.

(56) References Cited

U.S. PATENT DOCUMENTS

| 4,293,173 A * | 10/1981 | Tricca ........................... 439/148 |
| 5,723,816 A | 3/1998 | Neece |
| 5,965,846 A | 10/1999 | Shotey et al. |
| 6,803,522 B2 * | 10/2004 | Skakun ........................... 174/66 |
| 7,074,078 B2 | 7/2006 | Shotey et al. |
| 7,186,917 B1 * | 3/2007 | Van De Wiele, Jr. ........... 174/66 |
| 7,230,184 B1 | 6/2007 | Shotey et al. |
| 2007/0029177 A1 | 2/2007 | Sprague |

* cited by examiner

*Primary Examiner* — Dhirubhai R Patel
(74) *Attorney, Agent, or Firm* — Richard L. Miller

(57) ABSTRACT

A shield for biasingly self-attaching to a duplex electrical receptacle in a wall without having to be plugged into the duplex electrical receptacle or having to enter the wall and for completely concealing the duplex electrical receptacle to completely hide and thereby protect the duplex electrical receptacle from paint when painting therearound. The shield includes a shell. The shell is generally rectangular parallelepiped shaped for biasingly self-attaching to the duplex electrical receptacle in the wall without having to be plugged into the duplex electrical receptacle or having to enter the wall and for completely concealing the duplex electrical receptacle to completely hide and thereby protect the duplex electrical receptacle from the paint when painting therearound.

4 Claims, 6 Drawing Sheets

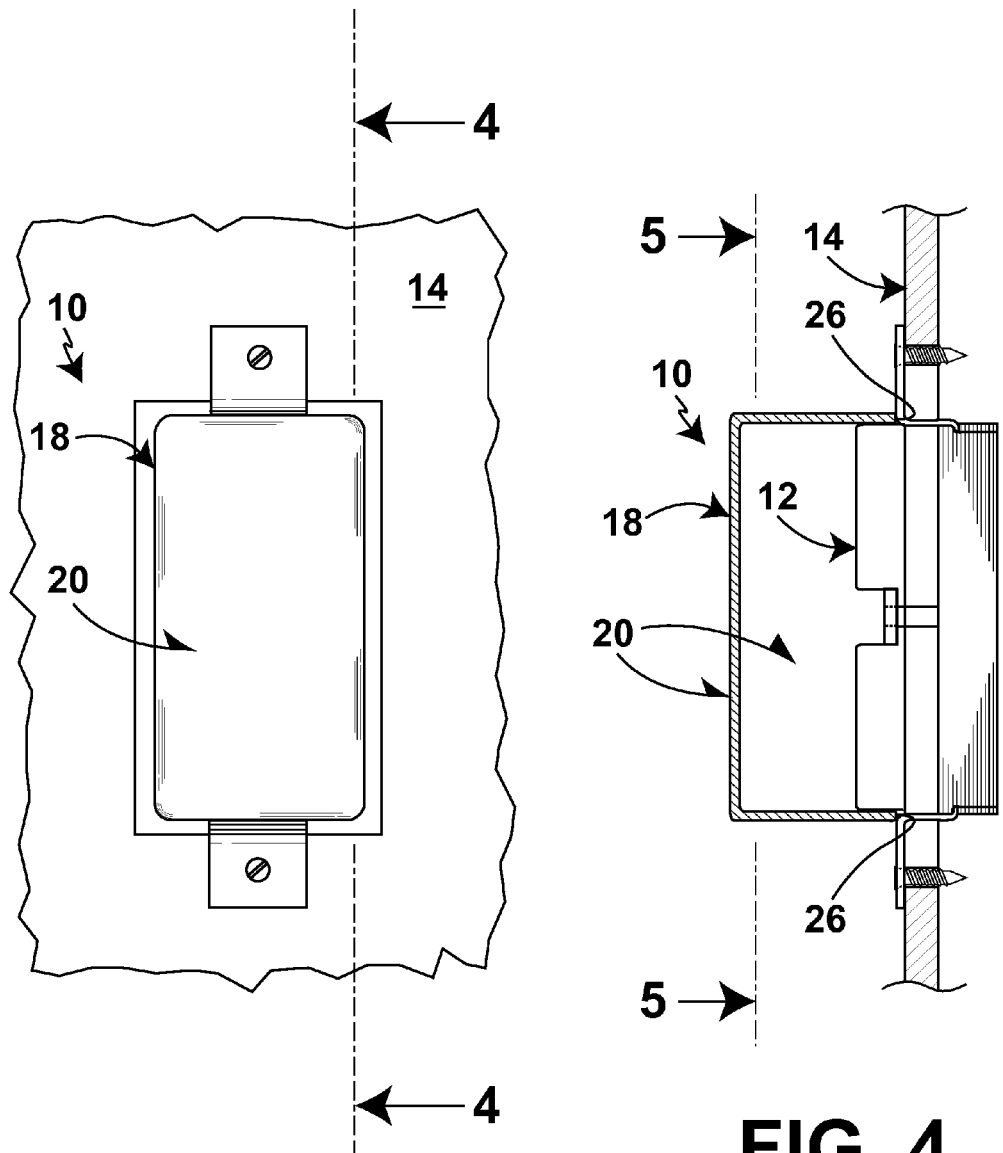

COVER FOR PROTECTING A DUPLEX ELECTRICAL RECEPTACLE AND SIMILAR DEVICES

BACKGROUND OF THE INVENTION

A. Field of the Invention

The embodiments of the present invention relate to a shield, and more particularly, the embodiments of the present invention relate to a shield for biasingly self-attaching to a duplex electrical receptacle in a wall without having to be plugged into the duplex electrical receptacle or having to enter the wall and for completely concealing the duplex electrical receptacle to completely hide and thereby protect the duplex electrical receptacle from contaminants typically paint when painting therearound.

B. Description of the Prior Art

Numerous innovations for covers for electrical switches and outlets have been provided in the prior art, which will be described below in chronological order to show advancement in the art, and which are incorporated in their entirety herein by reference thereto. Even though these innovations may be suitable for the specific individual purposes to which they address, nevertheless, they differ from the present invention in that they do not teach a shield for biasingly self-attaching to a duplex electrical receptacle in a wall without having to be plugged into the duplex electrical receptacle or having to enter the wall and for completely concealing the duplex electrical receptacle to completely hide and thereby protect the duplex electrical receptacle from paint when painting therearound.

(1) U.S. Pat. No. 5,723,816 to Neece.

U.S. Pat. No. 5,723,816—issued to Neece on Mar. 3, 1998 in U.S. class 174 and subclass 66—teaches a paint shield for electrical switches and outlets for covering an electrical outlet or light switch when the face plate is removed during painting of the wall thereby preventing paint from leaking into the socket. The shield includes a rectangular plate that includes a switch aperture, a right flexible clip and a left flexible clip that clamp to a light switch mesial, and a rubber arcuate cover surrounding the switch aperture.

(2) U.S. Pat. No. 5,965,846 to Shotey et al.

U.S. Pat. No. 5,965,846—issued to Shotey et al. on Oct. 12, 1999 in U.S. class 174 and subclass 66—teaches a cover plate for hiding the faces of sockets by covering an electrical outlet, including the faces of the sockets. The cover plate is mounted over the receptacle, and has apertures for plug blades. In the preferred embodiment, the cover plate is rectangularly shaped to cover a duplex receptacle, having apertures to receive plug blades and a center hole for receiving a screw that secures the cover plate over the duplex receptacle.

(3) U.S. Pat. No. 7,074,078 to Shotey et al.

U.S. Pat. No. 7,074,078—issued to Shotey et al. on Jul. 11, 2006 in U.S. class 439 and subclass 536—teaches a cover plate for hiding the face of sockets by covering an electrical outlet, including the face of the sockets. The cover plate is mounted over the receptacle, and has apertures for plug blades. In the preferred embodiment, the cover plate is rectangularly shaped to cover a duplex receptacle, having apertures to receive plug blades and a center hole for receiving a screw that secures the cover plate over the duplex receptacle.

(4) United States Patent Application Publication Number 2007/0029177 to Sprague.

United States Patent Application Publication Number 2007/0029177—published to Sprague on Feb. 8, 2007 in U.S. class 200 and subclass 19.38—teaches a protective cover for an electrical box of a type having vertical side walls embedded within a wall surface and enclosing a light switch or outlet protruding through an opening of the electrical box and beyond the plane of the wall surface. The cover has a rectangular box portion defining a peripheral dimension substantially similar to a dimension of the opening of the electrical box, and has a cavity sized to receive the protruding light switch. Flanges extend outward laterally from the rectangular box portion, and are configured to rest on the wall surface. Further, side extensions coupled to the rectangular box portion are adapted to slidably engage with the vertical side walls of the electrical box to secure the protective cover in place.

(5) U.S. Pat. No. 7,230,184 to Shotey et al.

U.S. Pat. No. 7,230,184—issued to Shotey et al. on Jun. 12, 2007 in U.S. class 174 and subclass 66—teaches a cover plate for hiding the socket faces of an electrical outlet. Particular embodiments of the cover plate are configured with multiple outlet configurations for use with more than one type of electrical outlet. The cover plate is mounted over the receptacle, and has apertures for plug blades or thin and puncturable films over the apertures for the plug blades. Particular embodiments include thickness around the plug blade apertures for receiving plug blades of not more than 0.075 inches between the socket face and the front surface of the cover plate.

It is apparent that numerous innovations for covers for electrical switches and outlets have been provided in the prior art, which are adapted to be used. Furthermore, even though these innovations may be suitable for the specific individual purposes to which they address, nevertheless, they would not be suitable for the purposes of the embodiments of the present invention as heretofore described, namely, a shield for biasingly self-attaching to a duplex electrical receptacle in a wall without having to be plugged into the duplex electrical receptacle or having to enter the wall and for completely concealing the duplex electrical receptacle to completely hide and thereby protect the duplex electrical receptacle from paint when painting therearound.

SUMMARY OF THE INVENTION

Thus, an object of the embodiments of the present invention is to provide a shield for biasingly self-attaching to a duplex electrical receptacle in a wall without having to be plugged into the duplex electrical receptacle or having to enter the wall and for completely concealing the duplex electrical receptacle to completely hide and thereby protect the duplex electrical receptacle from paint when painting therearound, which avoids the disadvantages of the prior art.

Briefly stated, another object of the embodiments of the present invention is to provide a shield for biasingly self-attaching to a duplex electrical receptacle in a wall without having to be plugged into the duplex electrical receptacle or having to enter the wall and for completely concealing the duplex electrical receptacle to completely hide and thereby protect the duplex electrical receptacle from contaminants typically paint when painting therearound. The shield includes a shell. The shell is generally rectangular parallelepiped shaped for biasingly self-attaching to the duplex electrical receptacle in the wall without having to be plugged into the duplex electrical receptacle or having to enter the wall and for completely concealing the duplex electrical receptacle to completely hide and thereby protect the duplex electrical receptacle from the paint when painting therearound.

The novel features considered characteristic of the embodiments of the present invention are set forth in the appended claims. The embodiments of the present invention themselves, however, both as to their construction and to their method of operation together with additional objects and advantages thereof will be best understood from the following description of the specific embodiments when read and understood in connection with the accompanying figures of the drawing.

BRIEF DESCRIPTION OF THE FIGURES OF THE DRAWING

The figures of the drawing are briefly described as follows:

FIG. 3 is an enlarged diagrammatic front elevational view of the shield of the embodiments of the present invention biasingly self-attached to a duplex electrical receptacle in the wall identified by ARROW 3 in FIG. 1;

FIG. 4 is a diagrammatic cross sectional view taken along LINE 4-4 in FIG. 3;

LIST OF REFERENCE NUMERALS UTILIZED IN THE FIGURES OF THE DRAWING

Figure 1:
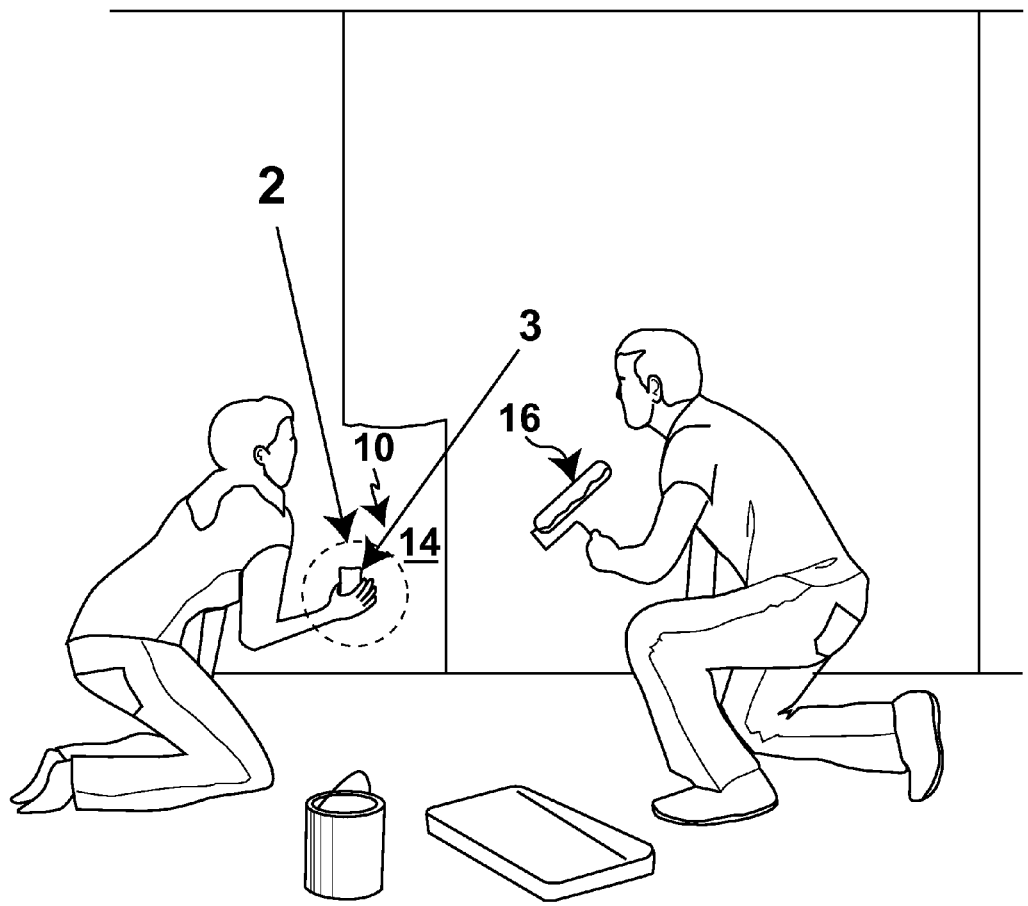
FIG. 1 is a diagrammatic perspective view of the shield of the embodiments of the present invention biasingly self-attached to a duplex electrical receptacle in a wall without having to be plugged into the duplex electrical receptacle or having to enter the wall and for completely concealing the duplex electrical receptacle to completely hide and thereby protect the duplex electrical receptacle from paint when painting therearound.

A. Introductory.
10 shield of embodiments of present invention for biasingly self-attaching to a duplex electrical receptacle 12 in wall 14 without having to be plugged into duplex electrical receptacle 12 or having to enter wall 14 and for completely concealing the duplex electrical receptacle 12 to completely hide and thereby protect the duplex electrical receptacle 12 from paint 16 when painting therearound
12 duplex electrical receptacle in wall 14
14 wall
16 paint B. Configuration of Shield 10.
18 shell for biasingly self-attaching to the duplex electrical receptacle 12 in wall 14 without having to be plugged into the duplex electrical receptacle 12 or having to enter wall 14 and for completely concealing the duplex electrical receptacle 12 to completely hide and thereby protect the duplex electrical receptacle 12 from paint 16 when painting therearound
20 three large side walls of shell 18
22 two opposing small end walls of shell 18
24 two free long edges of two opposing large side walls 20 of shell 18, respectively
26 two free short edges of two opposing small end walls 22 of shell 18, respectively
28 open rear of shell 18 for allowing shell 18 to cover the duplex electrical receptacle 12
30 first contact point of six contact points
32 second contact point of six contact points
34 third contact point of six contact points
36 fourth contact point of six contact points
38 fifth contact point of six contact points
40 sixth contact point of six contact points

DETAILED DESCRIPTION OF THE PREFERRED EMBODIMENTS

A. Introductory.

Figure 2:
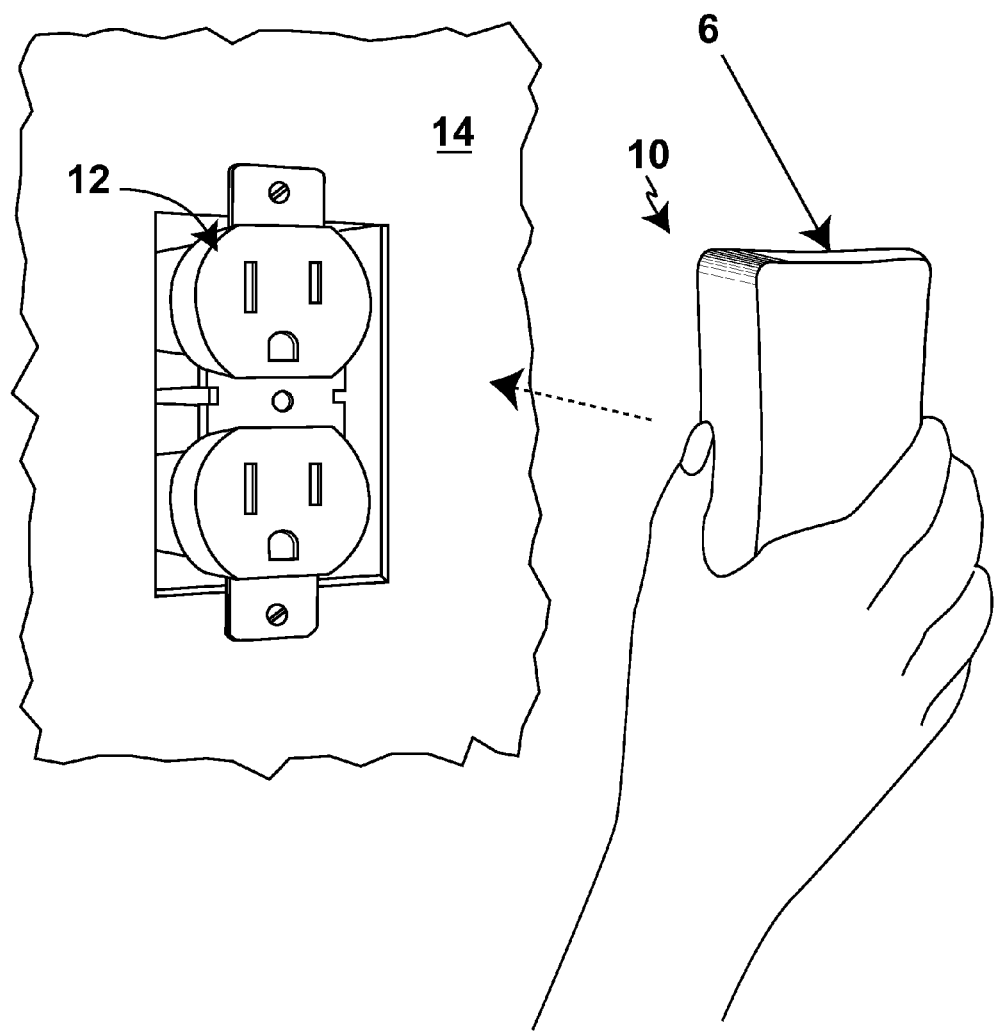
FIG. 2 is an enlarged and exploded perspective view of the area generally enclosed by the dotted curve identified by ARROW 2 in FIG. 1 of the shield of the embodiments of the present invention about to be biasingly self-attached to the duplex electrical outlet.
Figure 5:
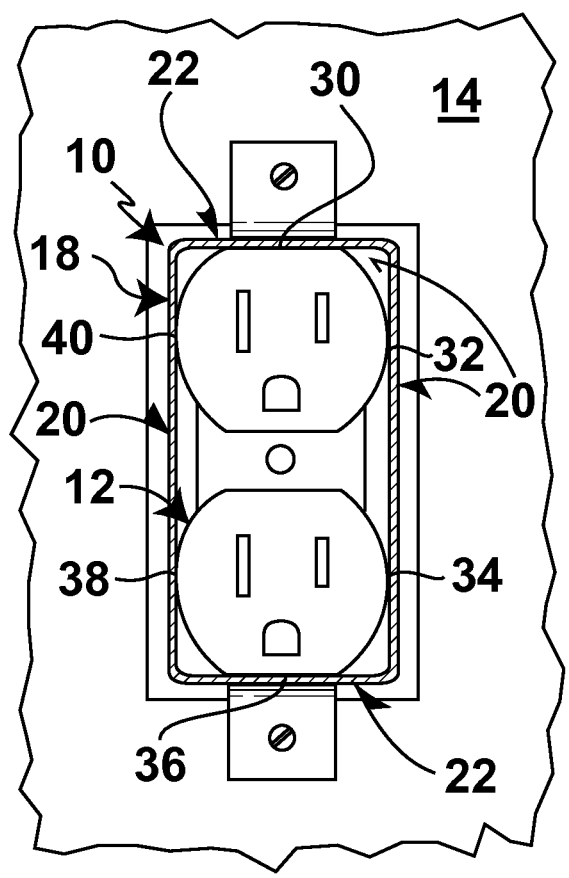
FIG. 5 is a diagrammatic cross sectional view taken along LINE 5-5 in FIG. 4.

Referring now to the figures, in which like numerals indicate like parts, and particularly to FIGS. 1 and 2, which are, respectively, a diagrammatic perspective view of the shield of the embodiments of the present invention biasingly self-attached to a duplex electrical receptacle in a wall without having to be plugged into the duplex electrical receptacle or having to enter the wall and for completely concealing the duplex electrical receptacle to completely hide and thereby protect the duplex electrical receptacle from contaminants typically paint when painting therearound, and an enlarged and exploded perspective view of the area generally enclosed by the dotted curve identified by ARROW 2 in FIG. 1 of the shield of the embodiments of the present invention about to be biasingly self-attached to the duplex electrical receptacle, the shield of the embodiments of the present invention is shown generally at 10 for biasingly self-attaching to a duplex electrical receptacle 12 in a wall 14 without having to be plugged into the duplex electrical receptacle 12 or having to enter the wall 14 and for completely concealing the duplex electrical receptacle 12 to completely hide and thereby protect the duplex electrical receptacle 12 from paint 16 when painting therearound.

B. Configuration of the Shield 10.

Figure 6:
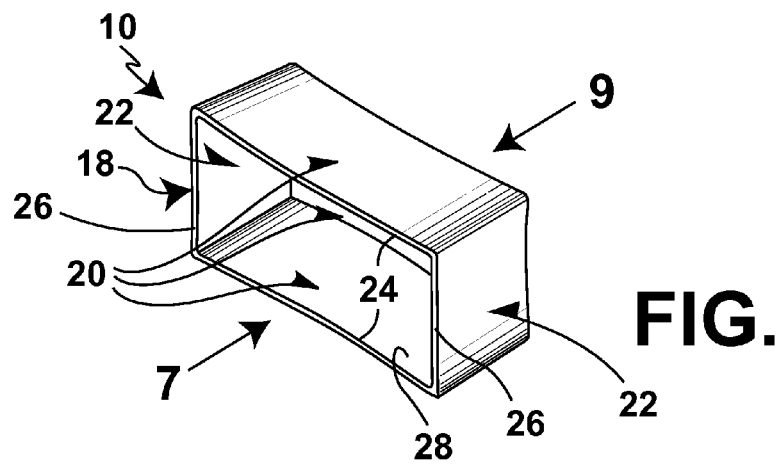
FIG. 6 is a diagrammatic perspective view of the shield of the embodiments of the present invention identified by ARROW 6 in FIG. 2.
Figure 7:
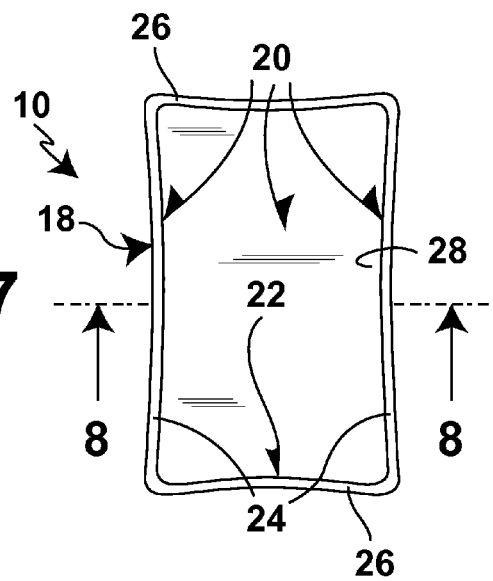
FIG. 7 is an enlarged diagrammatic rear elevational view taken generally in the direction of ARROW 7 in FIG. 6.
Figure 8:
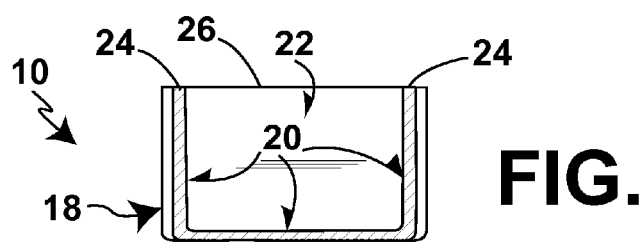
FIG. 8 is a diagrammatic cross sectional view taken along LINE 8-8 in FIG. 7.
Figure 9:
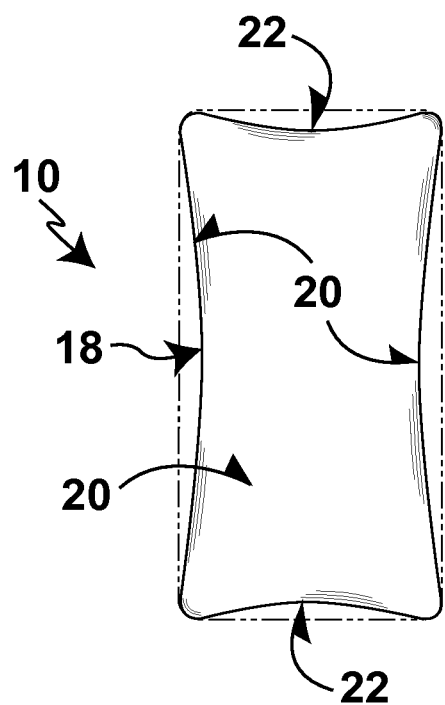
FIG. 9 is an enlarged diagrammatic front elevational view taken generally in the direction of ARROW 9 in FIG. 6.

The configuration of the shield 10 can best be seen in FIGS. 3, 4, 5, and 6-9, which are, respectively, an enlarged diagrammatic front elevational view of the shield of the embodiments of the present invention biasingly self-attached to a duplex electrical receptacle in the wall identified by ARROW 3 in FIG. 1, a diagrammatic cross sectional view taken along LINE 4-4 in FIG. 3, a diagrammatic cross sectional view taken along LINE 5-5 in FIG. 4, a diagrammatic perspective view of the shield of the embodiments of the present invention identified by ARROW 6 in FIG. 2, an enlarged diagrammatic rear elevational view taken generally in the direction of ARROW 7 in FIG. 6, a diagrammatic cross sectional view taken along LINE 8-8 in FIG. 7, and an enlarged diagrammatic front elevational view taken generally in the direction of ARROW 9 in FIG. 6, and as such, will be discussed with reference thereto.

The shield 10 comprises a shell 18. The shell 18 is generally rectangular parallelepiped shaped for biasingly self-attaching to duplex (FIGS. 4 and 5) electrical receptacle 12 in the wall 14 without having to be plugged into the duplex (FIGS. 4 and 5) electrical receptacle 12 or having to enter the wall 14 and for completely concealing the duplex (FIGS. 4 and 5) electrical receptacle 12 to completely hide and thereby protect the duplex (FIGS. 4 and 5) electrical receptacle 12 from the paint 16 when painting therearound.

The shell 18 is made from a resilient material for biasingly self-attaching to the duplex (FIGS. 4 and 5) electrical receptacle 12 in the wall 14 without having to be plugged into the duplex (FIGS. 4 and 5) electrical receptacle 12 or having to enter the wall 14.

The shell 18 being generally rectangular parallelepiped shaped has three large side walls 20 and two opposing small end walls 22.

Two opposing large side walls 20 of the shell 18 have two free long edges 24, respectively, and the two opposing small end walls 22 of the shell 18 have two free short edges 26, respectively.

The two free long edges 24 of the two opposing large side walls 20 of the shell 18, respectively, and the two free short edges 26 of the two opposing small end walls 22 of the shell 18, respectively, define an open rear 28 of the shell 18. The open rear 12 of the shell 18 is for allowing the shell 18 to cover the duplex electrical receptacle 12.

The two opposing large side walls 20 of the shell 18 and the two opposing small end walls 22 of the shell 18 are slightly concaved (FIG. 9) so as to allow the two opposing large side walls 20 of the shell 18 and the two opposing small end walls 22 of the shell 18 to be forced outwardly by the duplex electrical receptacle 12 when the shell 10 is placed over the duplex electrical receptacle 12 against the biasing of the two opposing large side walls 20 of the shell 18 and the two opposing small end walls 22 of the shell 18, and in doing so, the shell 18 is biasingly self-attached pressing at six points of contact 30, 32, 34, 36, 38, and 40 on the duplex electrical receptacle 12 in the wall 14 without having to be plugged into the duplex electrical receptacle 12 or having to enter the wall 14 and thereby completely conceal the duplex electrical receptacle 12 to completely hide and thereby protect the duplex electrical receptacle 12 from the paint 16 when painting therearound.

C. Impressions.

It will be understood that each of the elements described above or two or more together may also find a useful application in other types of constructions differing from the types described above.

While the embodiments of the present invention have been illustrated and described as embodied in a shield for biasingly self-attaching to a duplex electrical receptacle in a wall without having to be plugged into the duplex electrical receptacle or having to enter the wall and for completely concealing the duplex electrical receptacle to completely hide and thereby protect the duplex electrical receptacle from paint when painting therearound, however, they are not limited to the details shown, since it will be understood that various omissions, modifications, substitutions, and changes in the forms and details of the embodiments of the present invention illustrated and their operation can be made by those skilled in the art without departing in any way from the spirit of the embodiments of the present invention.

Without further analysis, the foregoing will so fully reveal the gist of the embodiments of the present invention that others can by applying current knowledge readily adapt them for various applications without omitting features that from the standpoint of prior art fairly constitute characteristics of the generic or specific aspects of the embodiments of the present invention.

The invention claimed is:

1. A shield for biasingly self-attaching to a duplex electrical receptacle in a wall without having to be plugged into the duplex electrical receptacle or having to enter the wall and for completely concealing the duplex electrical receptacle to completely hide and thereby protect the duplex electrical receptacle from contaminants, said shield comprising:
   a shell;
   wherein said shell is generally rectangular parallelepiped shaped for biasingly self-attaching by pressing at six points of contact on the duplex electrical receptacle in the wall without having to be plugged into the duplex electrical receptacle or having to enter the wall and for completely concealing the duplex electrical receptacle to completely hide and thereby protect the duplex electrical receptacle from contaminants;
   wherein said shell being generally rectangular parallelepiped shaped has:
   a) three large side walls; and
   b) two opposing small end walls; and
   wherein said two opposing large side walls of said shell and said two opposing small end walls of said shell are slightly concaved so as to allow said two opposing large side walls of said shell and said two opposing small end walls of said shell to be normally biased inwardly yet be forced outwardly by the duplex electrical receptacle when said shell covers the duplex electrical receptacle against biasing of said two opposing large side walls of said shell and said two opposing small end walls of said shell, and in doing so, said shell is self-attached to the duplex electrical receptacle in the wall without having to be plugged into the duplex electrical receptacle or having to enter the wall and thereby completely conceals the duplex electrical receptacle to completely hide and thereby protect the duplex electrical receptacle from the contaminants.

2. The shield of claim 1, wherein said shell is made from a resilient material for biasingly self-attaching to the duplex electrical receptacle in the wall without having to be plugged into the duplex electrical receptacle or having to enter the wall.

3. The shield of claim 1, wherein two opposing large side walls of said shell have two free long edges, respectively; and
   wherein said two opposing small end walls of said shell have two free short edges, respectively.

4. The shield of claim 3, wherein said two free long edges of said two opposing large side walls of said shell, respectively, and said two free short edges of said two opposing small end walls of said shell, respectively, define an open rear of said shell; and
   wherein said open rear of said shell is for allowing said shell to cover the duplex electrical outlet.

* * * * *